Jan. 4, 1927.

R. MATTICE 1,612,980

TRUCK FOR SUPPORTING ELECTRIC WELDING APPARATUS

Filed Sept. 12, 1924

Inventor
Royal Mattice

By Donald U. Rich
Attorney

Patented Jan. 4, 1927.

1,612,980

UNITED STATES PATENT OFFICE.

ROYAL MATTICE, OF PHILADELPHIA, PENNSYLVANIA.

TRUCK FOR SUPPORTING ELECTRIC WELDING APPARATUS.

Application filed September 12, 1924. Serial No. 737,319.

This invention relates to trucks, and has particular reference to trucks for supporting electric welding apparatus but is, of course, susceptible of use with various other kinds of apparatus and machinery.

It has been found in practice, especially in large machine shops and the like, that it is most impractical to move portable welding apparatus from place to place because the floors are usually so filled with machinery or other articles. Moving portable welding apparatus to various places becomes quite a problem from the standpoint of time wasted in such moving. It is therefore one object of the present invention to provide means whereby the welding apparatus may be bodily lifted by a crane or the like to effect moving of such apparatus to any desired point.

It has also been found that considerable time is saved by providing with the truck means for receiving tools, glass and other articles required by the welder so that the same are always at hand. It is, therefore, a further object of this invention to provide the truck with means for receiving the articles required by the welder in his work.

A still further object of the invention is to provide means associated with the truck for storing overalls, or other clothing so that a welder may always have his working clothes at hand and also may have a place to store clothing while he is at work.

Other objects and advantages of this invention will be apparent from the following description, taken in conjunction with the accompanying drawings in which.

Referring now, more particularly to the drawings, in which similar characters of reference designate similar parts in the several views, 1 indicates the truck body or base which may be a single piece of wood or cast metal as desired, the same being supported on wheels 2, and having positioned and secured thereon a welding apparatus shown diagrammatically at 3, it being understood that other apparatus may be supported by the truck.

Secured to the base, by bolts 4 or the like and extending upwardly therefrom near each end is a lifting element or standard 5 of substantially U-shape the intermediate portion of each of which is recessed as shown at 6 whereby to be engaged by a hook or the like from a crane or similar apparatus.

Figure 1:
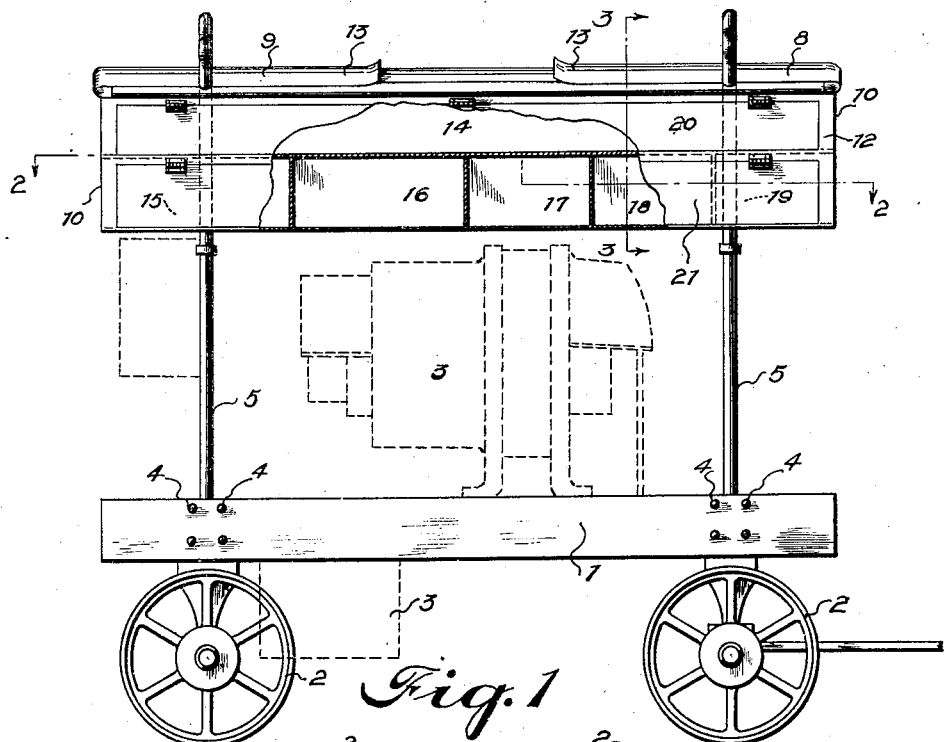
Figure 1 is a side elevation, partly in section of the truck of the present invention.
Figure 2:
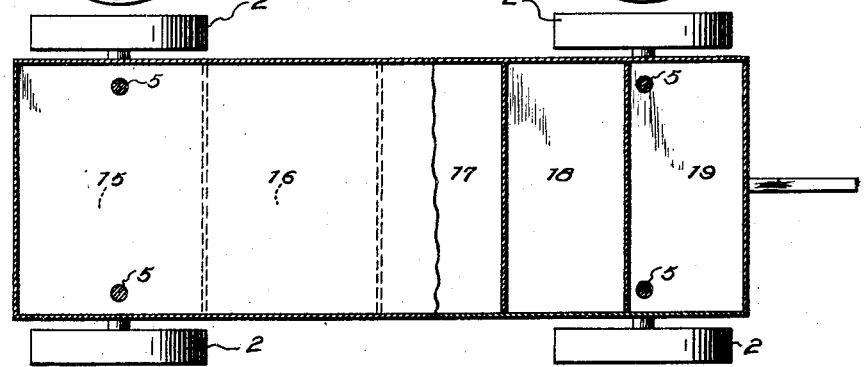
Figure 2 is a view taken on the line 2—2 of Fig. 1.
Figure 3:
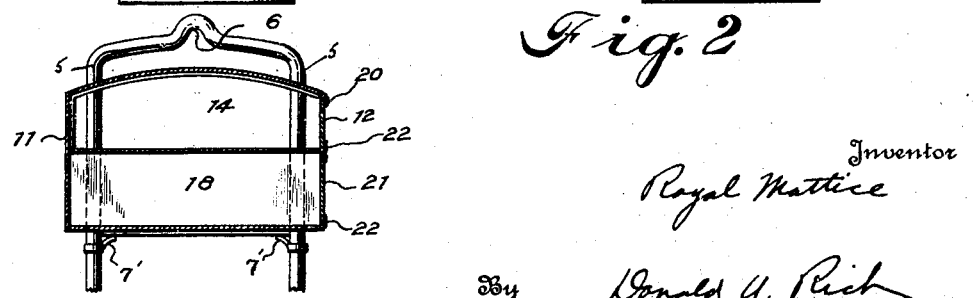
Figure 3 is a sectional view taken on the line 3—3 of Fig. 1.

Secured to or formed integral with said lifting elements are shoulders 7' carrying brackets 7' which serve to support a top designated generally at 8. It will be noted that the lifting elements 5 extend through the top 8 as more clearly shown in Fig. 3.

The top comprises a box-like structure having a cover 9, ends 10 and sides 11 and 12. To the cover 9 are secured flexible flaps 13 which may be dropped to enclose the machine when not in use. Four flaps may be provided, if desired, although only two are shown.

The interior of the top is subdivided into a plurality of compartments 14, 15, 16, 17, 18 and 19. Compartment 14, it will be seen extends the full length of the top and side 12 is provided with hingedly mounted doors 20 and 21, formed therein; door 20 covering compartment 14, while door 21 covers compartments 15 to 19 inclusive. To secure the doors, locks 22 or the like are provided.

From the above description it is believed that the invention will be fully apparent to those skilled in the art but I desire it understood that the drawings are for illustrative purposes only and that various changes in the form and proportions of the device may be made within the scope of the appended claims without departing from the spirit of the invention.

What I claim as my invention and desire to secure by United States Letters Patent is:

1. In a truck, a base adapted to support a welding apparatus, a top having a plurality of storage compartments, and U-shaped standards extending from said base and supporting said top, said standards extending through the top with the intermediate portions thereof positioned above said top and each having a recess adapted to receive a hook or the like whereby the truck may be lifted and moved about by a crane or the like.

2. A device of the kind described comprising a portable frame adapted to be readily transported from place to place and to support a welding machine outfit, a top having storage compartments, and means secured to said frame and supporting said top and extending through and over the latter; said means being so formed as to receive a hook or the like whereby the device may be lifted and moved about.

In testimony whereof I affix my signature.

ROYAL MATTICE.